United States Patent [19]

Kawaguchi et al.

[11] Patent Number: 4,772,340
[45] Date of Patent: Sep. 20, 1988

[54] METHOD OF MAKING IRON-BASE ARTICLES HAVING A REMELTED LAYER

[75] Inventors: Masatoshi Kawaguchi; Hiroshi Yoshinaga; Fusao Nakajima; Toshihiko Matsubara; Hisao Hirono; Masayoshi Higashi; Tetsuo Iwahashi; Norio Tajima; Toshihiko Saga; Shohei Hayakawa; Akitaka Inou, all of Saitama; Kunio Kishino, Tochigi, all of Japan

[73] Assignee: Honda Giken Kogyo Kabushiki Kaisha, Tokyo, Japan

[21] Appl. No.: 145,717

[22] Filed: Jan. 15, 1988

Related U.S. Application Data

[63] Continuation of Ser. No. 883,406, Jul. 8, 1986, abandoned.

[30] Foreign Application Priority Data

Jul. 9, 1985 [JP] Japan .................. 60-150570

[51] Int. Cl.4 .............................. C21D 9/30
[52] U.S. Cl. .................... 148/152; 148/902; 148/903; 219/121.36
[58] Field of Search ............... 148/2, 4, 13, 145, 152, 148/902, 903, 904; 427/34, 531; 219/121 P

[56] References Cited

U.S. PATENT DOCUMENTS

| | | | |
|---|---|---|---|
| 4,000,111 | 12/1976 | Sato et al. | 148/4 |
| 4,015,100 | 3/1977 | Gnanamuthu et al. | 148/4 |
| 4,048,348 | 9/1977 | Bailey et al. | 427/34 |
| 4,157,923 | 6/1979 | Yen et al. | 148/4 |
| 4,212,900 | 7/1980 | Serlin | 148/4 |
| 4,299,860 | 11/1981 | Schaefer et al. | 427/531 |
| 4,300,474 | 11/1981 | Livsey | 427/531 |
| 4,327,155 | 4/1982 | Hanneman | 427/34 |
| 4,328,257 | 5/1982 | Muehlberger | 427/34 |
| 4,330,568 | 5/1982 | Boehm et al. | 427/34 |
| 4,400,408 | 8/1988 | Asano et al. | 219/121 |
| 4,513,977 | 4/1985 | Umeha et al. | 148/4 |

FOREIGN PATENT DOCUMENTS

| | | |
|---|---|---|
| 2134662 | 1/1973 | Fed. Rep. of Germany . |
| 54-057010 | 5/1979 | Japan . |
| 55-064964 | 5/1980 | Japan . |

OTHER PUBLICATIONS

UGLOV "Lasers in Methallurgy and Technology of Inorganic Material", *Sov. J. Quant. Electron.*, 4, 464 (1971).
Reinke, *Elektrowarme Int'l.*, 39, B315 (12/81).

*Primary Examiner*—Melvyn J. Andrews
*Assistant Examiner*—S. Kastler
*Attorney, Agent, or Firm*—Armstrong, Nikaido, Marmelstein & Kubovcik

[57] ABSTRACT

An iron-base article such as a camshaft has a remelted layer of high wear resistance on a cam surface, for example. To make such an iron-base article, molten metal is poured into a mold with a chill set therein to cast an iron-base article having a chilled region formed in contact with said chill. Then, metal powder which provides wear resistance upon being mixed is added to at least a portion of said chilled region. A high level of energy is applied to the portion of the chilled region to heat and remelt the same, and the remelted portion is thereafter cooled to form a remelted layer therein.

18 Claims, 7 Drawing Sheets

METHOD OF MAKING IRON-BASE ARTICLES HAVING A REMELTED LAYER

This application is a continuation of application Ser. No. 883,406, filed 7/8/86, now abandoned.

BACKGROUND OF THE INVENTION

1. Field of the Invention

The present invention relates to an iron-base article having a wear-resistant surface and a method of making such an iron-base article, and more particularly to an iron-base article having a remelted chill layer of high hardness in a region which requires resistance to abrasive wear and a method of making such an iron-base article.

2. Description of the Relevant Art

Iron-base articles such as camshafts or rocker arms have surfaces held in sliding contact with other members. Therefore, such surfaces are required be highly resistant to wear such as scuffing and pitting. As internal combustion engines are designed in recent years for higher power output, the cam lobe surfaces of cam shafts and the sliding-contact surfaces of rocker arms are subject to higher pressure, and they are required to be more and more resistant to wear.

One conventional way of casting such an iron-base article has been to set a chill in a mold and pour molten metal into the mold in contact with the chill, which rapidly cools and solidifies the casting to form a chilled layer of high hardness. With this conventional practice, however, the internal structure of the chilled layer is so coarse that the chilled layer does not have sufficient wear resistance. To eliminate this shortcoming, an effort has been made to mix a metal such as Cr, Mo, Ni, Cu or Mn for producing an iron-base article having a closer chilled structure of greater hardness. The effort has been unsuccessful because the addition of such a metal increases the hardness of an article region which is to be machined, with the result that the machinability of the article is lowered.

Another attempt has been to cast an iron-base article without forming a chilled structure, to employ a heater such as a TIG torch to remelt a region of the iron-base article which requires to be resistant to wear, and then to cooling the remelted region to produce a chilled layer. Where the iron-base article is a camshaft, this process is time-consuming and uneconomical since the camshaft must be remelted over its entire circumferential surface in order to lower the pressure imposed on the sliding-contact cam surface and also to prevent pitting from being generated. Furthermore, inasmuch as the side walls of cam lobes have bare cast surfaces, oxides on the cam lobe side walls tend to be trapped in the cam lobes when the cam lobes are remelted fully across their widths, thus producing gas holes or deforming the cam lobes.

Japanese Laid-Open Patent Publication No. 60 (1985)-234168 entitled "Remelted camshaft and method of making the same" discloses a method of remelting and hardening a camshaft of cast iron. The disclosed method comprises the steps of casting a camshaft while a chill is being disposed partly or fully over a cam profile to form a hardened chill layer, then applying high-density energy such as TIG welding arc or laser beam to the entire chilled surface laser of the sliding-contact cam surface thereby to heat and remelt the surface layer, and thereafter allowing the remelted surface layer to be cooled to form a hardened chill layer composed of cementite as a major phase fully over the sliding-contact cam surface. With this method, however, the hardness and wear resistance that can be attained are limited since the hardened chill layer formed by the chill is merely remelted by heating means such as a TIG torch and then cooled.

According to one conventional remelting and hardening process, as disclosed in Japanese Patent Publication No. 57(1982)-6494, a heater such as a plasma torch is positioned at a distance from a sliding-contact cam surface of a camshaft in confronting relation thereto, and the camshaft is rotated about its own axis while the plasma torch is reciprocally moved transversely across the sliding-contact cam surface, so that an arc produced by the plasma torch will be applied to the cam surface in a tortuous pattern. Where the cam lobe is heated and melted while the camshaft is being rotated about its own axis, the melted region is positioned higher than a previous region which has been melted immediately earlier. The melted region is therefore caused by gravity and the pressure of the arc from the plasma torch to flow over the previously melted region, thereby developing a deformed area on the cam profile. Such a localized deformation must be ground away after the remelting and hardening process. This is disadvantageous in that a large grinding allowance is required, a grinding crack may be developed, and the grinding process is complex and time-consuming.

The conventional remelting and hardening procedure requires a preheating step for rapidly melting a camshaft. It takes a considerable period of time for a plasma torch arc to travel from a point where preheating is started to a point where preheating is finished. As a consequence, it is difficult to maintain all cams to be remelted at the same temperature, and the camshaft cannot be remelted quickly.

SUMMARY OF THE INVENTION

Therefore, it is an object of the present invention to provide an iron-base article having a remelted layer of high hardness and excellent wear resistance, which is produced by forming a remelted layer chilled by a remelting and hardening process over a cast chilled region, and a method of making such an iron-base article.

Another object of the present invention is to provide an iron-base article having a remelted layer free of oxides that would be entrapped in its surface layer when remelted and also of gas holes, and a method of making such an iron-base article.

Still another object of the present invention is to provide an iron-base article having a remelted layer which includes no localized deformation on remelted and hardened surfaces such as sliding-contact cam surfaces, has a small grinding allowance, and can easily be ground after being remelted and hardened, and a method of making such an iron-base article.

A still further object of the present invention is to provide an iron-base article having a remelted layer that can quickly be melted by maintaining regions to be remelted at the same temperature, and a method of making such an iron-base article.

A yet still further object of the present invention is to provide an iron-base article having a remelted layer in which added metal particles are uniformly dispersed to produce a solid homogenous phase, and a method of making such an iron-base article.

According to the present invention, there is provided a method of making an iron-base article having a remelted layer, comprising the steps of pouring molten metal into a mold with a chill set therein to cast an iron-base article having a chilled region formed in contact with the chill, adding metal powder which provides wear resistance upon being mixed to at least a portion of the chilled region, applying a high level of energy to the portion of the chilled region to heat and remelt the same, and cooling the remelted portion to form a remelted layer therein.

The high level of energy is produced by a plasma arc generated by a plasma torch. The plasma arc is applied to the cast chilled region at an obtuse angle with respect to a tangential line at a point of intersection between the axis of the plasma torch and the cast chilled region at all times in the direction in which the plasma torch advances with respect to the article. The portion of the cast chilled region which is heated and remelted by the plasma arc is positioned at the same level as or at a level lower than that of a portion which has been heated and remelted immediately earlier.

The plasma arc is generated by a pulse arc current and stirs the melt powder in a molten pool formed by remelting the cast chilled region, whereupon the metal powder is uniformly dispersed to produce a solid homogenous phase.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
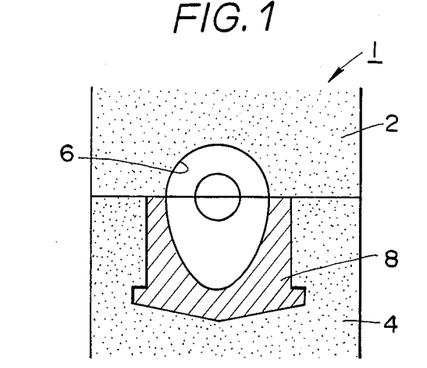
FIG. 1 is a fragmentary cross-sectional view of a mold employed for casing a camshaft.
Figure 2:
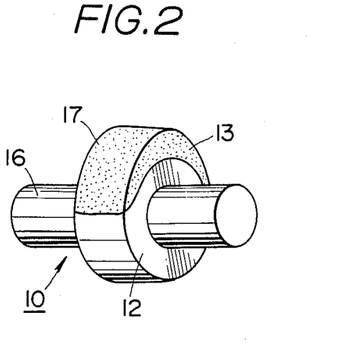
FIG. 2 is a fragmentary perspective view of a cam shaft produced by the mold shown in FIG. 1.

FIG. 1 illustrates a mold 1 comprising an upper mold member 2 and a lower mold member 4. The upper and lower mold members 2, 4, as they are coupled to each other, define a mold cavity 6 therebetween which is shaped complementarily to a camshaft to be cast. A cast chill 8 for forming a cam lobe is placed in the cavity 6. A molten metallic material composed of 3.47 wt % of C, 1.18 wt % of Si, 0.57 wt % of Mn, 0.09 wt % of P, 0.087 wt % of S, 0.42 wt % of Cr, and the remainder of Fe is poured into the mold 1 to cast a camshaft 10 as shown fragmentarily in FIG. 2. The camshaft 10 generally comprises a cam 12 (only one shown) having a cam lobe 13 and a journal 16. The cam lobe 13 includes a cast chilled region 17 formed by the chill 8.

Figure 3:
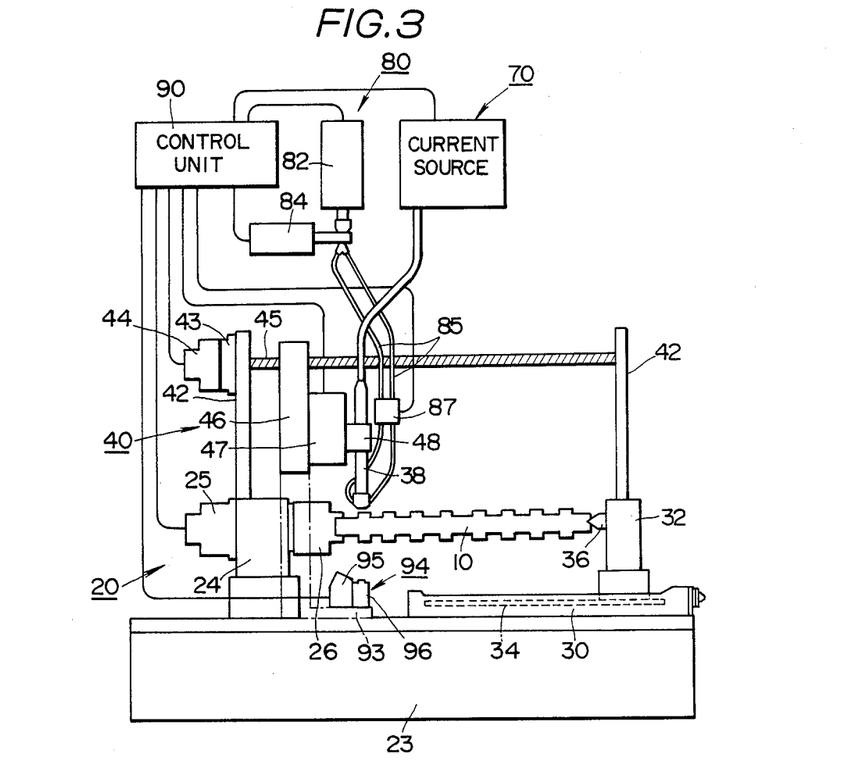
FIG. 3 is a schematic elevational view, partly in block form, of a remelting and hardening system used to carry out a method of the present invention.

FIG. 3 shows a remelting and hardening system for manufacturing an iron-base article having a remelted layer according to the present invention. The remelting and hardening system generally comprises a mechanism 20 for supporting and rotating a camshaft 10, a plasma torch 38, a mechanism 40 for moving the plasma torch 38, an arc current source 70, a mechanism 80 for supplying metal powder, and a control unit 90.

The camshaft supporting and rotating mechanism 20 includes a base 23, a speed reducer 24 fixedly mounted on the base 23, a step motor 25 coupled to one side of the speed reducer 24 for rotating the camshaft 10 about its own axis, and a workpiece chuck 26 coupled to the opposite side of the speed reducer 24 remotely from the step motor 25 for supporting one end of the camshaft 10. A support bed 30 is fixedly mounted on the base 23. A spindle support 32 is movably disposed on the support bed 30, the spindle support 32 being movable by a suitable driver mechanism toward and away from the workpiece chuck 26 while being guided by a guide bar 34. The other end of the camshaft 10 is supported by a spindle 36 mounted on the spindle support 32.

The plasma torch moving mechanism 40 includes a pair of support frames 42 fixed to the base 23, a transmission mechanism 43 attached to one of the support frames 42, and a step motor 44 coupled to the transmission mechanism 43. A feed screw 45 is supported between the support frames 42 and has one end coupled to the transmission mechanism 43, the feed screw 45 being disposed between two vertically spaced guide bars (not shown) extending between the support frames 42. These guide bars and the feed screw 45 extend through a mobile holder base 46, the feed screw 45 being held in operative threaded engagement with the mobile holder base 46. Therefore, the mobile holder base 46 is movable by the step motor 44 along the guide bars and the feed screw 45. To the mobile holder base 46, there are attached a step motor 47 for vertically moving the plasma torch 38 and a holder 48 for holding the plasma torch 48.

Figure 4:
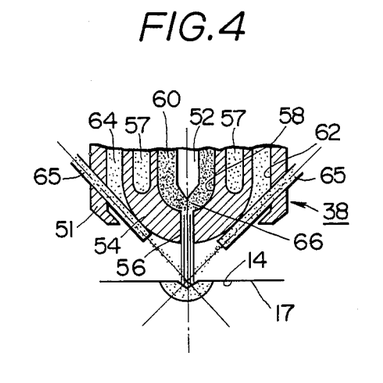
FIG. 4 is a fragmentary cross-sectional view of the tip of a plasma torch.

FIG. 4 shows in cross section the tip of the plasma torch 38 held by the holder 48. The plasma torch 38 has a nozzle cover 51 and a tungsten electrode 52 disposed centrally in the nozzle cover 51 and surrounded by a copper electrode 54. The copper electrode 54 has an arc passage 56 defined in its tip end for passage of a plasma arc therein, the copper electrode 54 being cooled by a cooling member 57. Between the tungsten electrode 52 and the copper electrode 54, there is defined an inner annular space 58 through which an argon gas 60 flows. Likewise, an outer annular space 62 is defined between the copper electrode 54 and the nozzle cover 51 for passage of a shielding gas 64 therein. Two supply tubes 65 for supplying powder of metal such as Cr, Mo, Ni or the like, other than the metallic material of the camshaft 10, are mounted on the tip of the plasma torch 38. These supply tubes 65 have their axes inclined with respect to the axis of the plasma torch 38 and intersecting on a sliding-contact surface 14 of the camshaft 10. Although only two supply tubes 65 are illustrated in the embodiment, as many, five for example, supply tubes may be mounted on the plasma torch 38 as the number of powder metals to be added to the camshaft 10. In operation, a pilot arc 66 is generated in the vicinity of an arc passage 56 extending from the tungsten electrode 52 through the copper electrode 54 for ionizing the argon gas 60.

Figure 5:
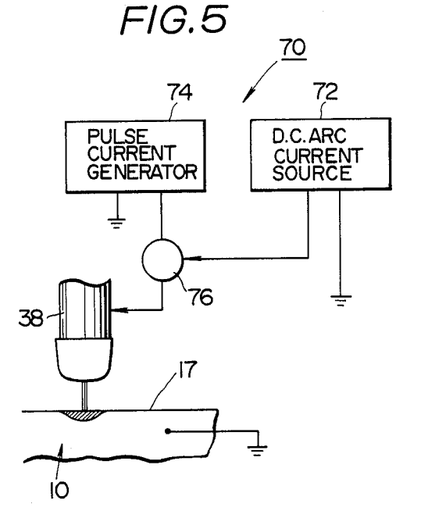
FIG. 5 is a block diagram of an arc current source for supplying an arc current to a plasma torch.
Figure 6:
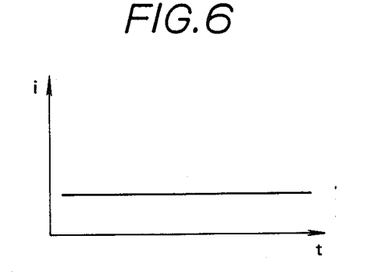
FIG. 6 is a graph showing the relationship between time and the magnitude of a DC arc current supplied from a DC arc current source shown in FIG. 1.
Figure 7:
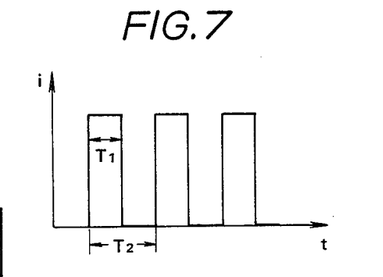
FIG. 7 is a graph showing the relationship between time and the magnitude of a pulse current supplied from a pulse current source shown in FIG. 1.
Figure 8:
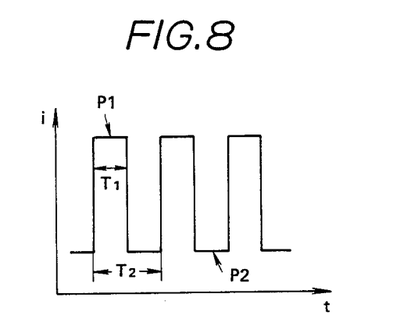
FIG. 8 is a graph showing the relationship between time and the magnitude of the pulse current supplied from the pulse current source of FIG. 7, as added to the DC arc current of FIG. 6 by an adder.

As shown in FIG. 5, an arc current source 70 comprises a DC arc current source 72 for supplying a DC arc current to the tungsten electrode 52 for generating an arc between the tungsten electrode 52 and the camshaft 10, and a pulse current generator 74 for producing a pulse current, and an adder 76. The DC arc current supply from the DC arc current source 72 is of a constant magnitude irrespective of time, as shown in FIG. 6. The pulse current generated by the pulse current generator 74 has a pulse duration T1 and a period T2 as shown in FIG. 7. The pulse current from the pulse current generator 74 is added by the adder 76 to the DC arc current from the DC arc current source 72 to produce an arc current having different magnitudes P1, P2 at peaks P1 and bases P2, as shown in FIG. 8. The arc current is supplied to the tungsten electrode 52 for producing a plasma arc 79 between the tungsten electrode 52 and the camshaft 10.

In FIG. 3, the metal powder supply mechanism 80 generally has a metal powder supply device 82 for supplying powder of metal other than the material of the camshaft 10 to the supply tubes 65 on the plasma torch 38, and a vibrator 84 for vibrating the metal powder supply device 82 to accelerate the supply of metal powder to the supply tubes 65. Two supply tubes 85 extend from the metal powder supply device 82 to the plasma torch 38 where they are coupled to the supply tubes 65, respectively. A sensor 87 for checking the supply of metal powder flowing through the supply tubes 85 is disposed on the supply tubes 85.

The control unit 90 comprises a computer which is programmed to supply pulse control signals to the step motors 25, 44, 47. The control unit 90 is also connected to the DC arc current source 72, the pulse current generator 74, the metal powder supply device 82, and the vibrator 84 for supplying drive signals to operate them.

An L-shaped extension 93 integral with the mobile holder base 46 extends downwardly therefrom and supports on its lower end a cam position sensor 94. The cam position sensor 94 comprises a laser beam emitter 95 for emitting a laser beam toward the camshaft 10 and a laser beam detector 96 for detecting a laser beam reflected by a cam. When one end of a cam is detected by the cam position sensor 94, a signal is send by the cam position detector 94 to the control unit 90, which then stops the mobile holder base 46.

Figures 9, 10, 11, 12:
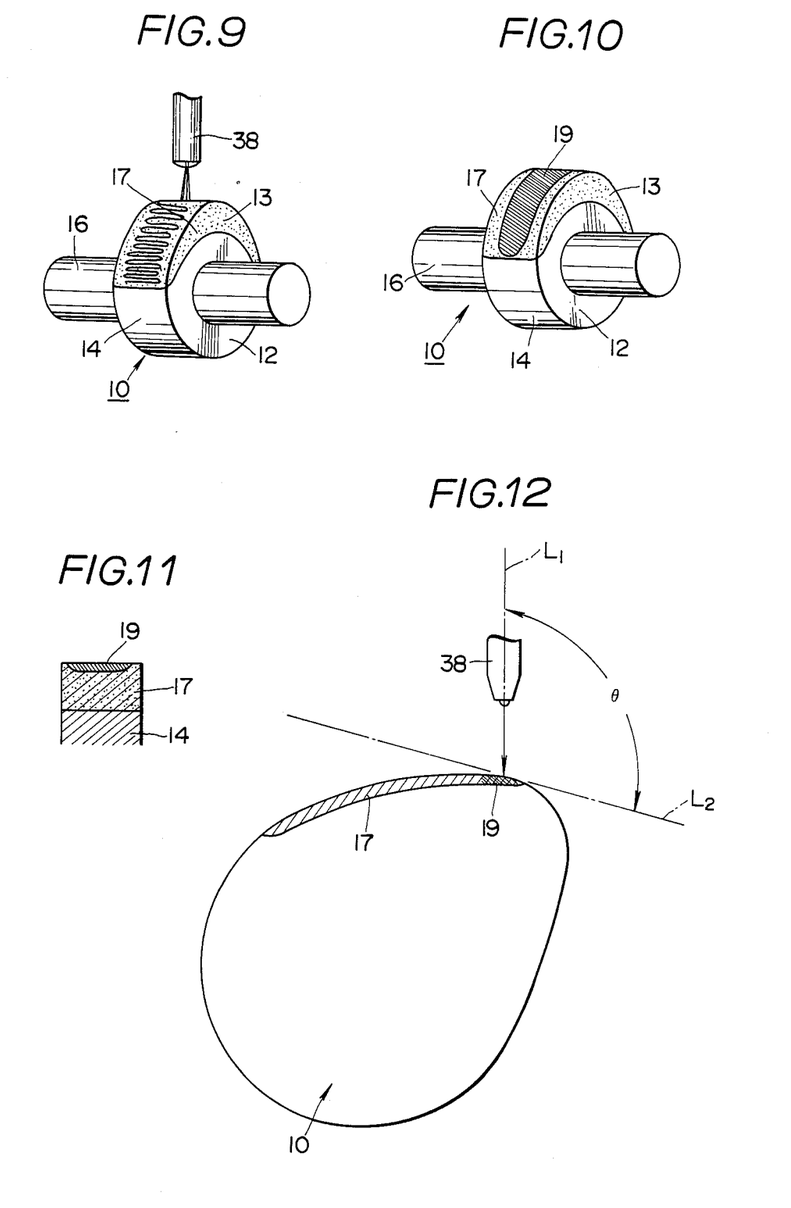
FIG. 9 is a fragmentary perspective view showing the manner in which a sliding-contact cam surface or lobe is remelted in a tortuous pattern by a plasma torch as it moves reciprocally.
FIGS. 10 and 11 are fragmentary perspective and cross-sectional views of a camshaft which has a remelted layer formed by the process shown in FIG. 9.
FIGS. 12 through 14 are schematic elevational views explanatory of an angle formed between the axis of a plasma torch and a line tangential to a camshaft at a melted portion.

Operation of the remelting and hardening system shown in FIG. 3 is as follows: After the camshaft 10 shown in FIG. 2 has been preheated by a preheater (not shown), it is transferred by a loader (not shown) between the chuck 26 and the spindle 36 and fixedly supported therebetween. Then, the mobile holder base 46 is moved to the left (FIG. 3) by the feed screw 46 rotated by the step motor 44, while at the same time the holder 48 is vertically moved by the step motor 47. The plasma torch 48 held by the holder 48 is thus laterally and vertically moved to cause its tip to travel with a prescribed clearance over the cam on the lefthand end of the camshaft 10. During this time, the camshaft 10 is rotated about its own axis at a low speed by the step motor 25 through the speed reducer 24. The plasma torch 48 is controlled to move its tip vertically in uniformly spaced relation to the cam surface, and to move its tip reciprocally over and across the sliding-contact cam surface 14 axially of the camshaft 10. Therefore, the plasma torch 38 is moved in a tortuous pattern (FIG. 9) over the sliding-contact surface cam 14, while at the same time the plasm torch 38 is energized to remelt a cam surface portion to be enhanced in wear resistance for forming a remelted layer 19 as shown in FIGS. 10 and 11.

Figure 13:
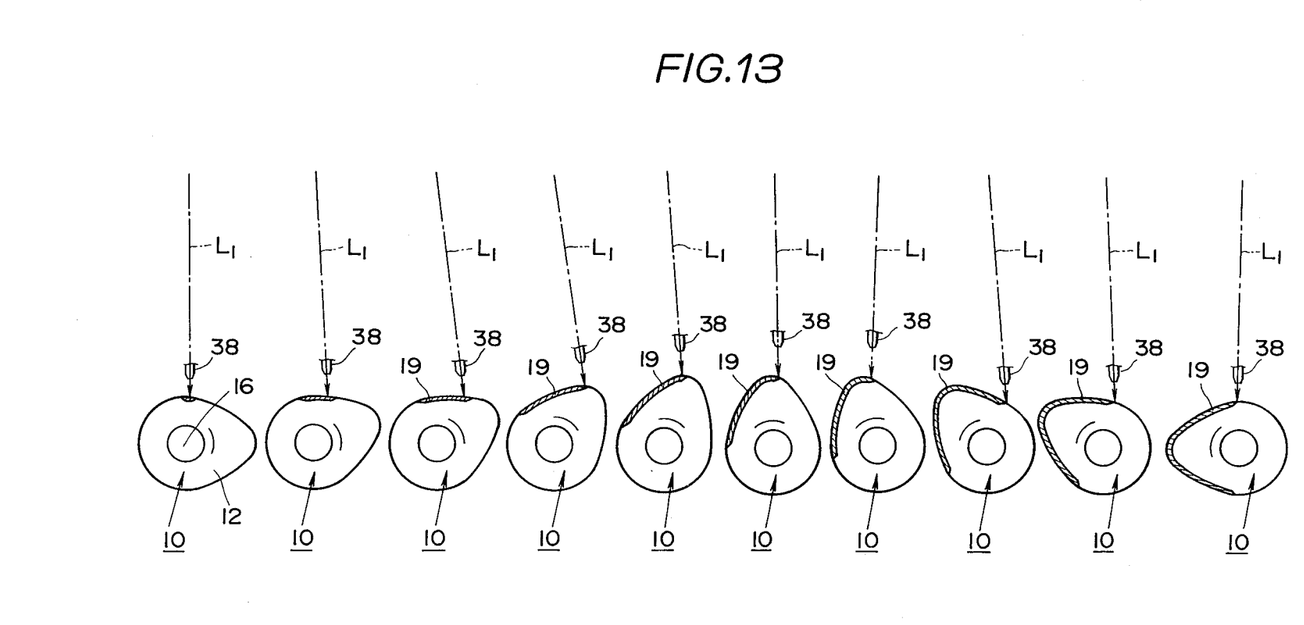

The plasma torch 38 is angularly movable in the circumferential direction of the sliding-contact cam surface 14 of the camshaft 10. As illustrated in FIGS. 12 and 13, the plasma torch 38 has its longitudinal axis L1 inclined at an angle $\theta$ to a line L2 tangential to the sliding-contact cam surface 14 at the remelted cam surface portion in a direction in which the plasma torch 38 advances with respect to the camshaft 10. Such an angle $\theta$ is selected to be an obtuse angle ($>90°$) at all times by angularly moving the plasma torch 38 with respect to the camshaft 10. The angle $\theta$ should preferably be determined such that the remelted cam surface portion lies flush with or slightly lower than a remelted region which has being formed immediately earlier.

Figure 14:
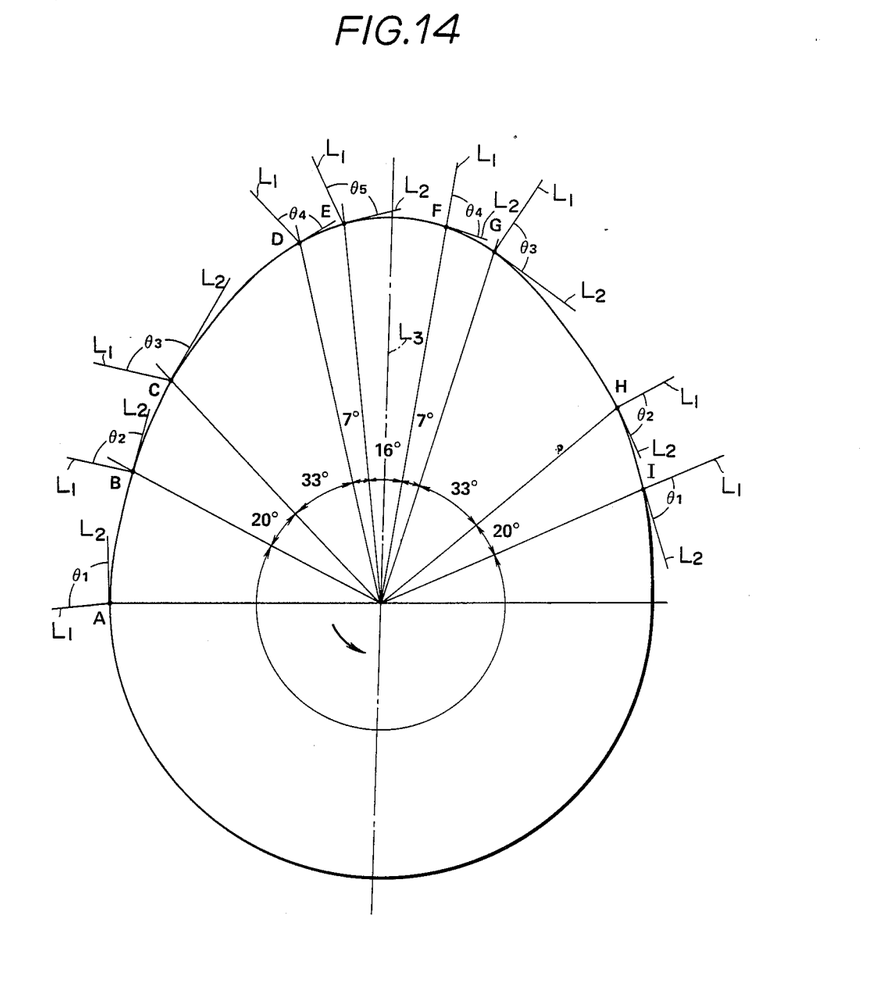

The angle $\theta$ formed between the plasma torch axis L1 and the tangential line L2 will be described in greater detail with reference to FIG. 14. It is assumed that points E, F on the cam surface 14 are angularly spaced 8° in opposite directions from a line L3 interconnecting the vertex of the cam lobe and the central axis of the camshaft 10, that a point D on the cam surface 14 is angularly displaced 7° from the point E toward a point A where the cam surface 14 is to start being remelted, that a point G on the cam surface 14 is angularly displaced 7° from the point E in a direction away from the point A, that a point C on the cam surface 14 is angularly displaced 33° from the point D toward the point A, that a point H on the cam surface 14 is angularly displaced 33° from the point G away from the point A, that a point B on the cam surface 14 is angularly displaced 20° from the point C toward the point A, and that a point I on the cam surface 14 is angularly displaced 20° from the point H away from the point A. The angle $\theta 1$ formed between the plasma torch axis L1 and the tangential line L2 is selected to be 100° from the point A to the point B. The angle $\theta 2$ formed between the plasma torch axis L1 and the tangential line L2 is selected to be 105° from the point B to the point C. The angle $\theta 3$ formed between the plasma torch axis L1 and the tangential line L2 is selected to be 110° from the point C to the point D. The angle $\theta 4$ formed between the plasma torch axis L1 and the tangential line L2 is selected to be 105° from the point D to the point E. The angle θ5 formed between the plasma torch axis L1 and the tangential line L2 is selected to be 100° from the point E to the point F. The angle formed between the plasma torch axis L1 and the tangential line L2 is selected to be equal to the angle θ4 from the point F to the point G. The angle formed between the plasma torch axis L1 and the tangential line L2 is selected to be equal to the angle θ3 from the point G to the point H. The angle formed between the plasma torch axis L1 and the tangential line L2 is selected to be equal to the angle θ2 from the point H to the point I. The angle formed between the plasma torch axis L1 and the tangential line L2 is selected to be equal to the angle θ1 from the point I to the point A. In the illustrated embodiment, the angle θ between the plasma torch axis L1 and the tangential line L2 varies discretely from segment to segment on the cam surface 14. However, the angle θ may be varied continuously with the angle of rotation of the camshaft 10. Through the above angle adjustment, the remelted region is prevented from being forced over a previously remelted region under the pressure of an arc ejected from the plasma torch 38. Since the remelted region is positioned so as to lie flush with or lower than a previously remelted region that has been formed immediately earlier, the remelted region will not fall by gravity over the previously remelted region, thus preventing the cam surface 14 from being locally deformed.

Figure 15:
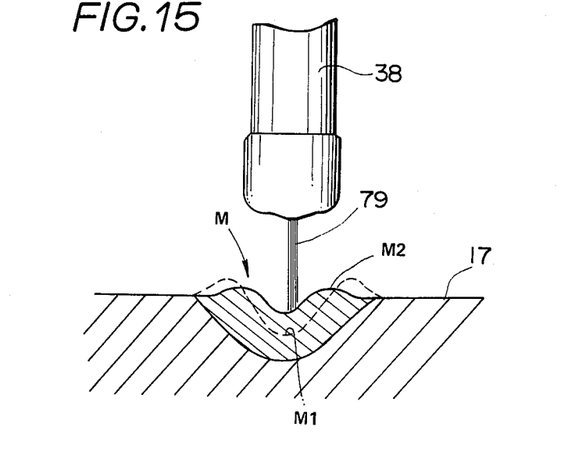
FIG. 15 is a fragmentary cross-sectional view illustrating a molten pool formed on a camshaft.

When the argon gas 60 is ionized into a high-temperature, high-speed plasma arc 79 and applied to the cam surface 14 of the camshaft 10, a molten pool M is formed on the surface layer of the cam surface 14 as shown in FIG. 15. A molten pool M1, indicated by the broken line in FIG. 15, is produced when the peaks P1 (FIG. 8) of the pulse current are applied. The greater the energy of the plasma arc 79 applied, the deeper the central area of the molten pool M and the higher the peripheral area thereof. A molten pool M2, indicated by the solid line in FIG. 15, is formed when the bases P2 (FIG. 8) of the pulse current are applied. Since the energy of the plasma arc 79 is lowered at this time, the central area of the molten pool is shallow and the raised peripheral area thereof is low. As the different levels of plasma arc energy are alternately applied, the molten pool M is caused to vibrate to stir metal powder supplied from the supply tubes 65 to the molten pool M and accelerated by the plasma arc 79. Therefore, the supplied metal powder is uniformly dispersed in the remelted layer to produce a solid homogeneous phase. The frequency of the pulse arc current may be selected in the range of from 2 to 30 Hz, and should preferably range from 5 to 30 Hz for best results. The pulse duration T1 may be in the range of from 5 to 95% of the period T2, and should preferably range from 20 to 80% for best results. The ratio between the peak value and the base value of the pulse current applied to the plasma torch 38 may range from 1.5 to 15, preferably from 2 to 15.

Figure 16:
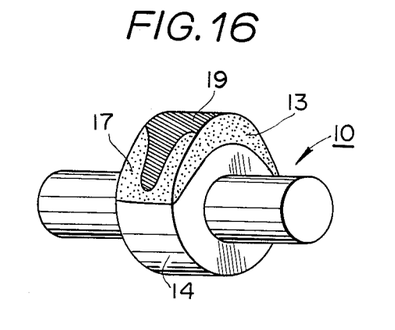
FIGS. 16 through 18 are fragmentary perspective views of other configurations of remelted layers formed on cam surfaces according to the process of FIG. 9.
Figure 17:
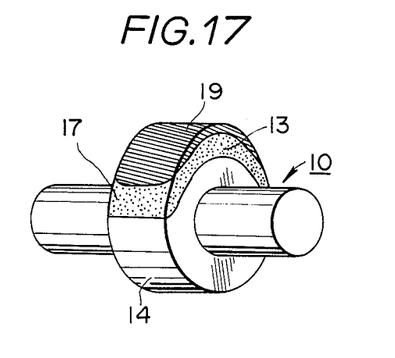
Figure 18:
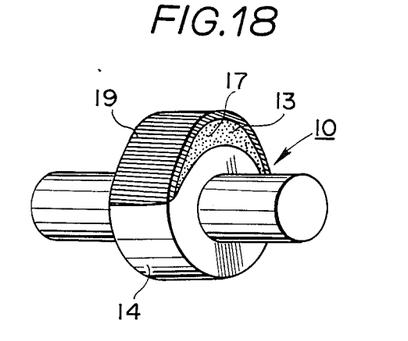

In the above embodiment, the cam surface is remelted and hardened except edges thereof. However, cam surfaces may be remelted and hardened at different regions which require higher hardness and greater wear resistance, as shown in FIGS. 16 through 18.

Figure 19:
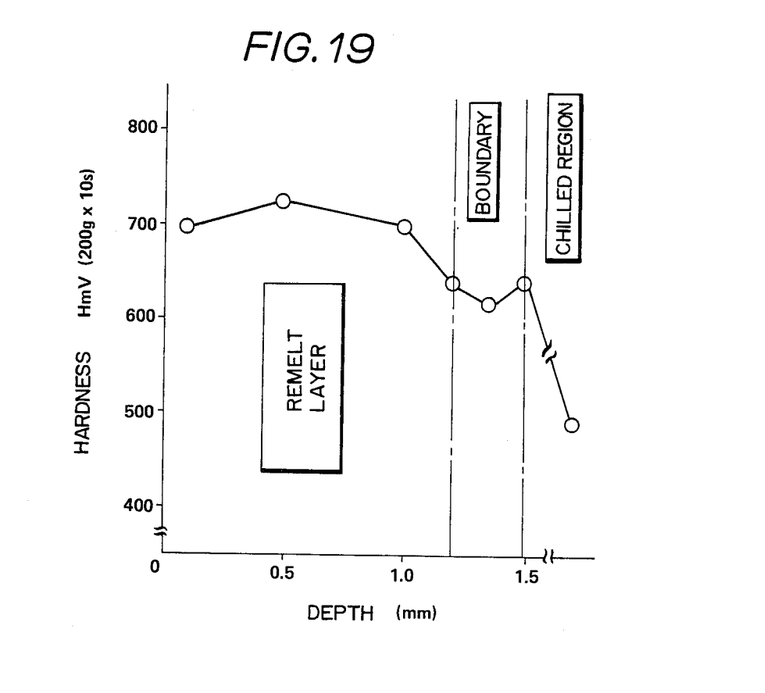
FIG. 19 is a graph showing, for comparison, the hardness of a chilled layer formed by the remelting and hardening process and the hardness of a cast chilled region formed by a chill set in a mold.

The remelted layer formed according to the present invention finds no precipitation of graphite. As shown in FIG. 19, the hardness of the remelted layer reaches about 700 HmV, which is higher than the hardness (600 HmV or less) of the chilled region that has been formed upon casting.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A method for remelting and hardening the cam surface of a camshaft the steps comprising:
    applying a high level of energy from a plasma arc generated by a plasma torch to the cam surface of the camshaft to be remelted and hardened continually at a predetermined obtuse angle to said cam surface to be remelted, the angle said high level of energy is applied to said cam surface varying as said camshaft is rotated so as to maintain said high level of energy continually at said predetermined obtuse angle to said cam surface as said cam shaft and said torch are rotated relative to each other;
    while applying said high level of plasma arc energy to said cam surface, rotating said plasma torch generating said plasma arc and said cam surface being remelted and hardened with respect to each other and, during said rotating, maintaining said plasma torch applying said energy continually at said predetermined obtuse angle to a line tangential to the cam surface undergoing remelting so that said surface undergoing remelting is slightly lower than the immediately preceding surface remelted while said preceding remelted surface hardens; and
    continuing said rotating, remelting and hardening until all of said cam surface to be hardened has been remelted and hardened.

2. A method, as recited in claim 1, in which said angle of said plasma torch applying said energy is adjusted as said camshaft and said cam surface are rotated to continually maintain said angle obtuse and said surface undergoing remelting slightly lower than said immediately preceding surface remelting while said preceding remelted surface hardens.

3. A method, as recited in any one of claims 1 to 2, in which said plasma arc is generated by a pulsating arc current.

4. A method, as recited in claim 3, in which said pulsating arc current comprises a DC arc current with a pulse arc current added thereto.

5. A method, as recited in claim 4, in which said DC arc current is of a constant magnitude and said pulse arc current is added to said constant DC arc current in pulses.

6. A method, as recited in claim 5, in which the frequency of said pulse arc current is not substantially less than $2H_z$ and not substantially more than $30H_z$.

7. A method, as recited in claim 5, in which the frequency of said pulse arc current is not substantially less than $5H_z$ and not substantially more than $30H_z$.

8. A method, as recited in claim 6, in which said pulse arc current is added to and disconnected from said DC arc current of constant magnitude in repeating pulses of substantially equal time duration.

9. A method, as recited in claim 6, in which the proportion of said equal time duration in which said pulse arc current is added to said DC arc current of constant magnitude is not substantially less than 5% and not substantially more than 95% of the total time duration.

10. A method, as recited in claim 6 in which the proportion of said equal time duration in which said pulse arc current is added to said DC arc current of constant magnitude is not substantially less than 20% and not substantially more than 80% of the total time duration.

11. A method, as recited in claim 7, in which the proportion of said equal time duration in which said pulse arc current is added to said DC arc current of constant magnitude is not substantially less than 5% and not substantially more than 95% of the total time duration.

12. A method, as recited in claim 7, in which the proportion of said equal time duration in which said pulse arc current is added to said DC arc current of constant magnitude is not substantially less than 20% and not substantially more than 80% of the total time duration.

13. A method, as recited in claim 11, in which said high level plasma arc energy applied to said cam surface forms a shallow pool of molten metal on said cam surface and said repeating pulses of substantially equal time duration vibrate and stir said molten metal in said pool.

14. A method, as recited in claim 12, in which said high level plasma arc energy applied to said cam surface forms a shallow pool of molten metal on said cam surface and said repeating pulses of substantially equal time duration vibrate and stir said molten metal in said pool.

15. A method, as recited in claim 13, in which said cam surface to be remelted and hardened is molded with a chill set therein at the region to be remelted and hardened and said chilled region has added thereto a metal powder which provides wear resistance to said surface when said surface is remelted, said metal powder is mixed therein and said surface is hardened.

16. A method, as recited in claim 14, in which said cam surface to be remelted and hardened is molded with a chill set therein at the region to be remelted and hardened and said chilled region has added thereto a metal powder which provides wear resistance to said surface when said surface is remelted, said metal powder is mixed therein and said surface is hardened.

17. A method, as recited in claim 10, in which the ratio between the peak value and the base value of said pulse arc current applied to said plasma torch is in a range from 1.5 to 15.

18. A method, as recited in claim 10, in which the ratio between the peak value and the base value of said pulse arc current applied to said plasma torch is in a range from 2 to 15.

* * * * *